March 8, 1932. C. F. H. BOHNHARDT Re. 18,381
AIR COOLED FLOATING ROOF
Original Filed Jan. 14, 1928
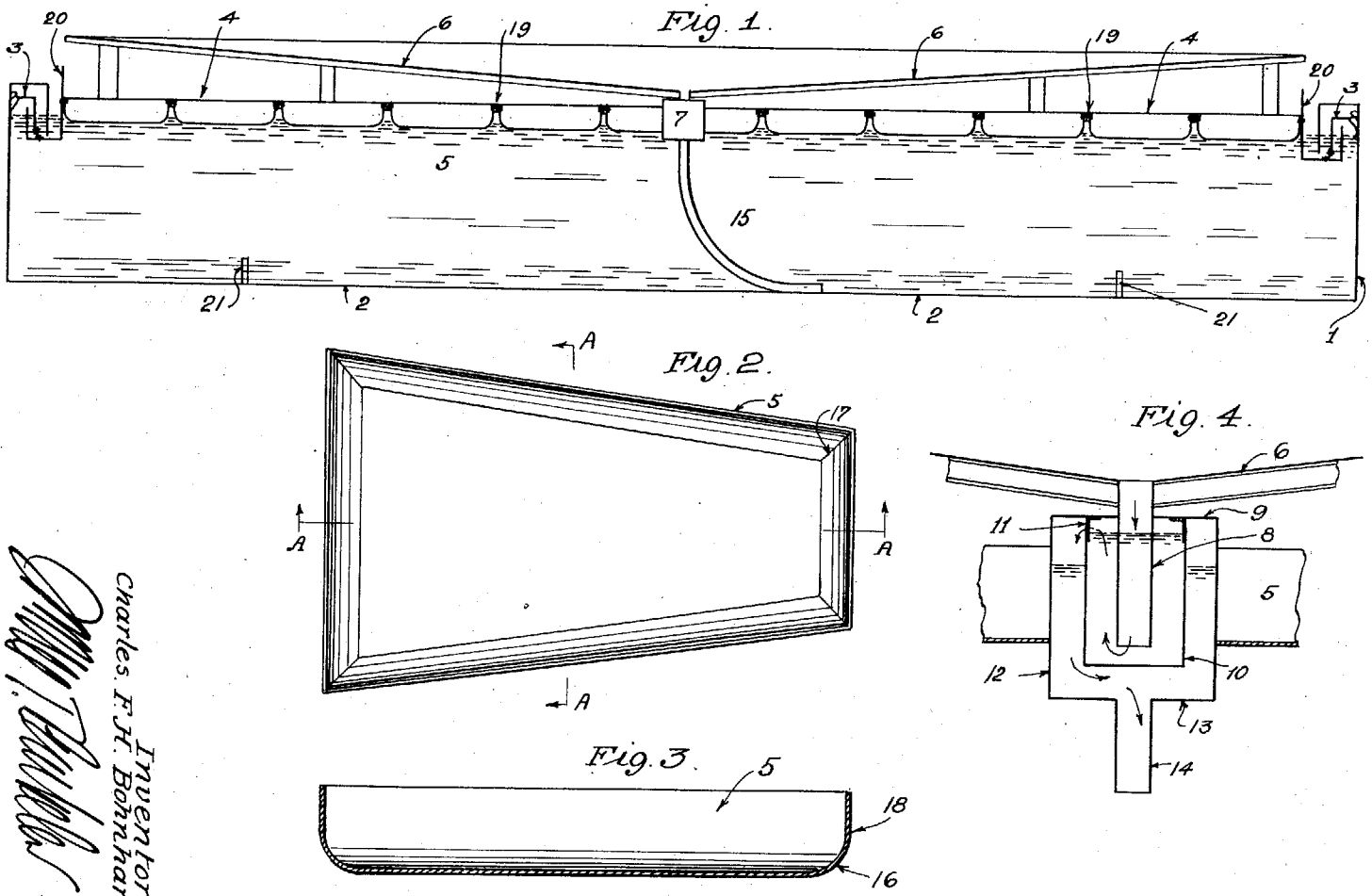
Inventor
Charles F. H. Bohnhardt.
Attorney.

Reissued Mar. 8, 1932

Re. 18,381

UNITED STATES PATENT OFFICE

CHARLES F. H. BOHNHARDT, OF LYNWOOD, CALIFORNIA, ASSIGNOR TO JULIAN A. CAMPBELL, OF LONG BEACH, CALIFORNIA

AIR-COOLED FLOATING ROOF

Original No. 1,714,207, dated May 21, 1929, Serial No. 246,758, filed January 14, 1928. Application for reissue filed March 9, 1931. Serial No. 521,322.

My present invention relates to the art of oil storage with especial reference to tank roofs which float on the surface of the oil.

The objects of my invention are:

To provide a floating roof with protective means for preventing the heating of the floating deck from the rays of the sun.

To provide in a floating roof for the disposal of rain water.

To provide a floating roof in which the floating deck seams are not in contact with the fluid in the tank.

To provide a floating roof with means for preventing the oil in the tank from getting on to the roof should the tank be filled to overflowing.

I attain these objects by the tank roof illustrated in the accompanying drawings in which Fig. 1 is a section through a tank showing my improved roof in position at the top of its travel.

Fig. 2 is a detail of a unit of the floating deck.

Fig. 3 is a typical section through one of these floating deck units on the line A—A.

Fig. 4 is a detail of a water trap indicated in the center of the roof in Fig. 1.

Referring to the drawings, numeral 1 indicates a tank wall and 2 the tank bottom. A vapor sealing means is indicated at 3 for preventing the escape of vapor between the roof and the tank wall. Any preferred means of accomplishing this end may be used, the means illustrated being the subject of my United States Patent No. 1,597,046 and forming no part of my present invention. Floating on the surface of the oil is the floating deck designated in general by numeral 4. This deck is composed of a plurality of units 5 (Figs. 2 and 3). Supported by posts from the floating deck is the weather roof 6, made of suitable plates supported by any preferred system of purlins and bracing. This roof completely covers the floating deck, protecting it from the heat of the sun. Furthermore, the space between the floating deck and weather roof being open, a free circulation of air takes place therebetween, materially helping to keep the temperature of the floating deck below the temperature of its surroundings. Evaporation caused by the heat of the sun is thus practically eliminated.

The weather roof pitches radially toward the center so that rain water runs to the center and escapes through the trap indicated at 7. Referring to Fig. 4 this trap is composed of a pipe 8 welded to the weather roof. Pipe 8 extends through and is welded to plate 9 and reaches to within an inch or two of the bottom of cup 10. This cup is materially larger than the pipe 8 and extends upwards to within an inch or so of the plate 9, to which it is secured by angle clips 11. A second cup 12 welded to plate 9 entirely surrounds cup 10. The bottom end of cup 12 is closed by plate 13 which carries the pipe nipple 14. A hose 15 is connected to nipple 14 and hangs down so as to lie on the floor of the tank. In this manner any water falling on the weather roof is conducted down to the water layer always found in the bottom of oil storage tanks. The arrows in Fig. 4 show the flow of this water through the trap. By the use of this trap the tank is always sealed preventing ingress of air even though it is entirely emptied of fluid.

Floating roofs used heretofore were usually made with a practically flat floating deck, buoyancy being obtained by the use of a vertical peripheral wall. In this construction the seams between the many plates of the deck are in contact with liquid and must be fluid tight. The buckling and warping of these plates makes this tightness difficult to preserve. In my present invention the seams between deck plates are not in contact with the oil and consequently do not have to be fluid tight. I accomplish this by making the plates as shown in Figs. 2 and 3. I first bend the edges of the plate as shown at 16 then burn the corner out and weld along the line indicated at 17. In this way I form a flat bottom basin, fluid tight in itself. The height of the side walls 18 is made greater than the submergence depth will be when the roof floats on the oil. These units are bolted or otherwise secured together as indicated at 19 to form the floating deck, the joints between units being made up with a canvas and red lead gasket or other suitable packing. Obviously the joints between units are above the fluid level. This construction has another advantage in that the side walls 18 serve as beams to stiffen the floating deck and eliminate the need of any additional bracing.

The shape and weight of the floating units must be determined from the dimensions of the tank on which they are to work. To one skilled in the art of tank fabrication the economical proportioning of these units would offer no difficulty.

Should a tank fitted with my present invention be filled to overflowing, the oil would break through the vapor seal 3 and would, if not prevented, flood the basins of the floating deck. To prevent this the sheets 20 extend above the top wall of the tank so that any overflow simply runs down the outside of the tank. In this same regard the inlet to pipe 8 must be higher than the top of the tank to prevent the flooding of the weather roof with oil.

The posts indicated at 21 support the roof when the tank is entirely emptied of oil.

It is obvious that the above principles of construction can be used with various modifications and I do not limit myself to the specific construction illustrated except as defined in the following claims.

I claim as my invention:

1. A floating roof for oil storage tanks, comprising: a deck floating on the surface of the oil; a vapor seal between said deck and the walls of said tank; an overflow sheet nonleakably secured around the edge of said deck and extending higher than the top of said tank when said deck occupies an upper position; a weather roof covering and positioned above said floating deck, said roof pitching downwardly towards its center; a water trap located at the lowest point of said weather roof, and a flexible conducting means secured to said trap for conveying rain water from said roof through said trap to the bottom of said tank.

2. In a rain water disposal means for an oil storage tank covered with a floating roof, a vapor proof trap comprising: a first passage downward and communicating with the upper side of said roof, a second passage upward communicating with the downward end of said first passage, a third passage downward communicating with the upper end of said second passage, the said passages forming a continuous passage and the change in passage direction between the said second and third passages being higher than the free top surface of said oil.

3. In an oil storage tank, a deck floating on the surface of the tank-contained oil, a weather roof supported above and carried by the deck in its movements vertically through the tank due to changes in oil level, said deck and roof being spaced vertically apart to define an air circulation space therebetween, said space opening horizontally outwardly directly to the atmosphere.

4. In an oil storage tank, a deck floating on the surface of the tank-contained oil, a weather roof supported above and carried by the deck in its movements vertically through the tank due to changes in oil level, said roof being appreciably annularly spaced from the tank walls, said deck and roof being spaced vertically apart to define an air circulation space therebetween, said space opening to the annular space between the tank walls and the roof.

5. In an oil storage tank, a deck floating on the surface of the tank-contained oil, a weather roof supported above and carried by the deck in its movements vertically through the tank due to changes in oil level, a vapor seal between said deck and the walls of the tank, said roof being appreciably annularly spaced from the tank walls, said deck and roof being spaced vertically apart to define an air circulation space therebetween, said space opening to the annular space between the tank walls and the roof.

6. In an oil storage tank, a deck floating on the surface of the tank-contained oil, a weather roof supported above and carried by the deck in its movements vertically through the tank due to changes in oil level, said deck and roof being spaced vertically apart to define an air circulation space therebetween, said space opening around the outer edge of the roof to the atmosphere.

CHARLES F. H. BOHNHARDT.